US008658267B2

(12) United States Patent
Onaka et al.

(10) Patent No.: US 8,658,267 B2
(45) Date of Patent: Feb. 25, 2014

(54) HIGH-FREQUENCY DIELECTRIC ATTACHMENT

(75) Inventors: Kengo Onaka, Kyoto-fu (JP); Takashi Ishihara, Kyoto-fu (JP); Masanori Kasai, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 13/594,755

(22) Filed: Aug. 24, 2012

(65) Prior Publication Data

US 2012/0321831 A1 Dec. 20, 2012

Related U.S. Application Data

(63) Continuation of application No. PCT/JP2010/068888, filed on Oct. 26, 2010.

(30) Foreign Application Priority Data

Feb. 26, 2010 (JP) ................................ 2010-041189

(51) Int. Cl.
*B32B 9/04* (2006.01)
*B32B 7/12* (2006.01)

(52) U.S. Cl.
USPC ........................... 428/40.1; 428/343; 428/354

(58) Field of Classification Search
USPC ....................... 428/40.1, 40.9, 41.1, 343–354
See application file for complete search history.

(56) References Cited

U.S. PATENT DOCUMENTS 4,298,642 A * 11/1981 Walter ......................... 428/40.9
4,638,271 A 1/1987 Jecko et al.
7,091,422 B1 * 8/2006 Stotz .......................... 174/117 F
8,382,749 B2 * 2/2013 Dunning et al. ................ 606/32

FOREIGN PATENT DOCUMENTS

JP 56-96708 U 7/1981
JP 59-230302 A 12/1984
JP 7-504280 A 5/1995
JP 9-238002 A 9/1997
JP 2005-198168 A 7/2005
JP 2008-112441 A 5/2008
JP 2008-191927 A 8/2008

OTHER PUBLICATIONS

International Search Report; PCT/JP2010/068888; Feb. 8, 2011.
Written Opinion; PCT/JP2010/068888; Feb. 8, 2011.

* cited by examiner

*Primary Examiner* — Patricia Nordmeyer
(74) *Attorney, Agent, or Firm* — Studebaker & Brackett PC

(57) ABSTRACT

This disclosure provides a high-frequency dielectric attachment capable of suppressing a decrease in Q value of a high frequency circuit and achieving a great adjusting effect. The high-frequency dielectric attachment is a laminate of an insulating sheet layer, adhesive layer, and a dielectric sheet layer. The insulating sheet layer forms an outermost layer of the laminate, and the adhesive layer and dielectric sheet layer are arranged in sequence below the insulating sheet layer. The width of the dielectric sheet layer is smaller than each of the width of the insulating sheet layer and the width of the adhesive layer. The adhesive layer projects beyond the dielectric sheet layer in the width direction.

7 Claims, 7 Drawing Sheets

101

HIGH-FREQUENCY DIELECTRIC ATTACHMENT

CROSS REFERENCE TO RELATED APPLICATIONS

The present application claims priority to International Application No. PCT/JP2010/068888 filed on Oct. 26, 2010, and to Japanese Patent Application No. 2010-041189 filed on Feb. 26, 2010, the entire contents of each of these applications being incorporated herein by reference in their entirety.

TECHNICAL FIELD

The present invention relates to a high-frequency dielectric attachment that is affixed to a predetermined position of a high frequency circuit and that is used for adjusting its electric characteristics.

BACKGROUND

One example of methods of adjusting the electric characteristics of a high frequency circuit in which a predetermined conductive pattern is disposed on a dielectric substrate is a method of adjustment by affixing dielectric tape to the dielectric substrate. For example, see Japanese Unexamined Patent Application Publication No. 9-238002 (Patent Document 1), Japanese Unexamined Patent Application Publication No. 59-230302 (Patent Document 2), and Japanese unexamined utility model Application Publication No. 56-96708 (Patent Document 3).

FIG. 1A is a plan view of a band-pass filter illustrated in Patent Document 1, and FIG. 1B is a cross-sectional view thereof. The band-pass filter is configured as a three-stage filter having a parallel coupled line structure using a half-wave resonator. A ground conductor 2 is disposed on the back side of a dielectric substrate 1. A half-wave resonator 3 having a three-stage configuration using microstrip lines is disposed on the front side of the dielectric substrate 1. An input pattern portion 4 and an output pattern portion 5 formed using microstrip lines connected to the above microstrip lines are disposed on the input side and the output side of the half-wave resonator 3, respectively. Dielectric tape 6 is affixed to the front side of the dielectric substrate 1 in a region other than the input pattern portion 4 and the output pattern portion 5. The dielectric tape 6 is formed from a thin dielectric film, and an adhesive is applied to the back side thereof.

The affixation of the dielectric tape 6, so as to cover the resonator 3 on the front side of the dielectric substrate 1, as described above, enables adjustment of the center frequency of the filter.

SUMMARY

The present disclosure provides a high-frequency dielectric attachment capable of suppressing a decrease in Q value of a high frequency circuit and achieving a great adjusting effect.

In an embodiment, a high-frequency dielectric attachment has a laminate including an insulating sheet layer, an adhesive layer, and a dielectric sheet layer. The insulating sheet layer forms an outermost layer of the laminate, and the adhesive layer and the dielectric sheet layer are arranged in sequence below the insulating sheet layer. The dielectric sheet layer has a width smaller than a width of each of the insulating sheet layer and the adhesive layer, and the adhesive layer projects beyond the dielectric sheet layer in a width direction thereof.

That is, the portion of the adhesive layer that projects beyond the dielectric sheet layer is exposed.

In another embodiment of the disclosure, a high-frequency dielectric attachment has a laminate including a conductive sheet layer, an adhesive layer, and a dielectric sheet layer. The conductive sheet layer forms an outermost layer of the laminate, and the adhesive layer and the dielectric sheet layer are arranged in sequence below the conductive sheet layer. The dielectric sheet layer has a width smaller than a width of each of the conductive sheet layer and the adhesive layer, and the adhesive layer projects beyond the dielectric sheet layer in a width direction thereof.

It yet another embodiment of the disclosure, a high-frequency dielectric attachment has a laminate of a conductive sheet layer, a dielectric sheet layer, and an adhesive layer. The conductive sheet layer forms an outermost layer of the laminate, and the dielectric sheet layer and the adhesive layer are arranged in sequence below the conductive sheet layer. The adhesive layer is arranged in a peripheral portion other than a central portion of the dielectric sheet layer.

In a more specific embodiment, the laminate may have the same width as the width of the dielectric sheet layer and be longitudinally wound in a roll shape.

In another more specific embodiment, the laminate may include separation paper (release paper) that covers at least an exposed portion of the adhesive layer.

In another more specific embodiment, the laminate may be cut in a half cut manner into sections each having a fixed length or a fixed size.

BRIEF DESCRIPTION OF DRAWINGS

8B is a front view of the high-frequency dielectric attachment in the thickness direction.

DETAILED DESCRIPTION

The inventors realized that in the dielectric tape disclosed in each of Patent Documents 1 to 3, Q of the adhesive layer for affixing the dielectric to the object is low. Thus when the adhesive layer is in direct contact with the object, the Q value of the high frequency circuit decreases. Because the relative permittivity of the adhesive layer is low, even when the relative permittivity of the dielectric sheet layer is high, the influence of the low relative permittivity of the adhesive layer makes it difficult to obtain a great adjusting effect. If the thickness of the dielectric sheet layer is increased to enhance the adjusting effect, problems arise in that it cannot be physically placed in a limited space and in that its fixation is difficult.

A high-frequency dielectric attachment that can address the above drawbacks according to a first exemplary embodiment will now be described with reference to FIGS. 2 to 4.

Figure 1A:
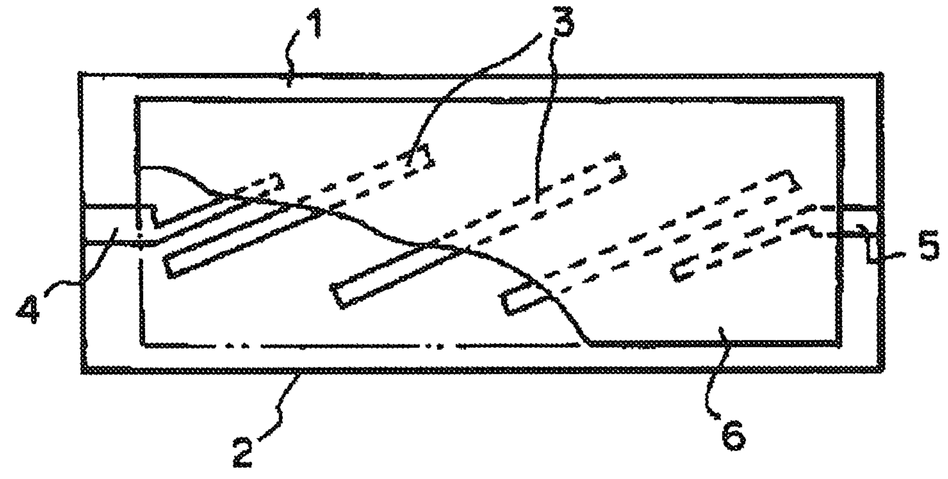
FIG.1A Prior Art
FIG. 1A is a plan view of a band-pass filter illustrated in Patent Document 1.
Figure 1B:
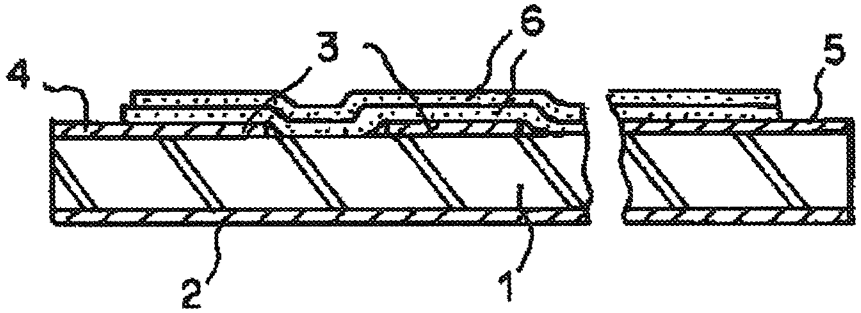
FIG.1B Prior Art
FIG. 1B is a cross-sectional view thereof.
Figure 2A:
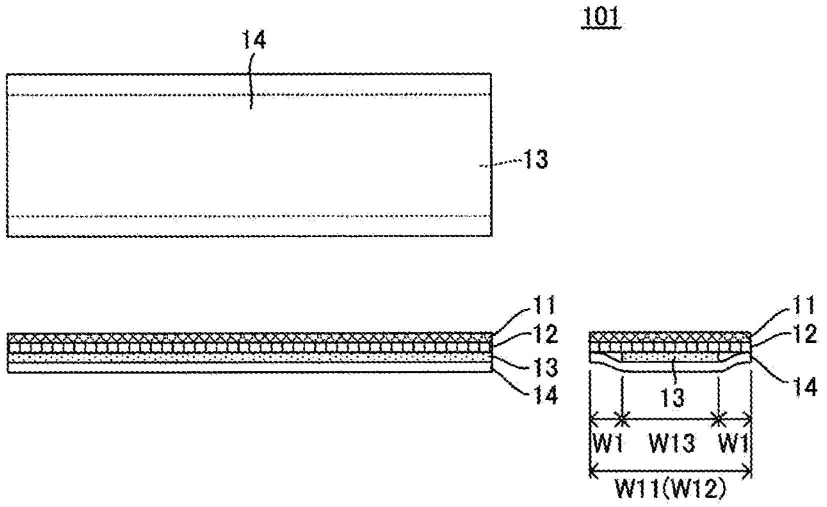
FIG. 2A is a three-view drawing of a high-frequency dielectric attachment according to a first exemplary embodiment.

FIG. 2A is a three-view drawing of a high-frequency dielectric attachment 101 according to the first embodiment. For the sake of clarity of the multilayer structure, the thickness direction is illustrated in a somewhat enlarged scale. The high-frequency dielectric attachment 101 is a laminate of an insulating sheet layer 11, adhesive layer 12, dielectric sheet layer 13, and separation paper (i.e., release paper) 14. The insulating sheet layer 11 forms the outermost layer (i.e., the top layer in the orientation illustrated in FIG. 2A). The adhesive layer 12, dielectric sheet layer 13, and separation paper 14 are arranged in sequence below the insulating sheet layer 11. The width W13 of the dielectric sheet layer 13 is smaller than each of the width W11 of the insulating sheet layer 11 and the width W12 of the adhesive layer 12, and the adhesive layer 12 projects beyond the dielectric sheet layer 13 in the width direction.

To use the high-frequency dielectric attachment 101, the separation paper 14 is separated, and the surface from which the separation paper 14 has been separated is affixed to an object. In the state where the separation paper 14 is separated, the portion of the adhesive layer 12 projecting beyond the dielectric sheet layer 13 in the width direction is exposed. The dimension W1 illustrated in the drawing indicates the width of the exposed portion of the adhesive layer 12.

The dielectric sheet layer 13 can be a mixture of a liquid crystal polymer (LCP) and dielectric ceramic powder, for example, and has a thickness of 5 to 50 μm.

In the state where the high-frequency dielectric attachment 101 is affixed to the object, the exposed portion of the adhesive layer 12 adheres to a peripheral portion other than the main part (i.e., central part) of the object. That is, the dielectric sheet layer 13 is in direct contact with the main part of the object, and the adhesive layer 12 is spaced apart from the main part of the object. Thus the main part of the object is substantially not subjected to the influence of the low Q value and low relative permittivity of the adhesive layer 12.

Figure 2B:
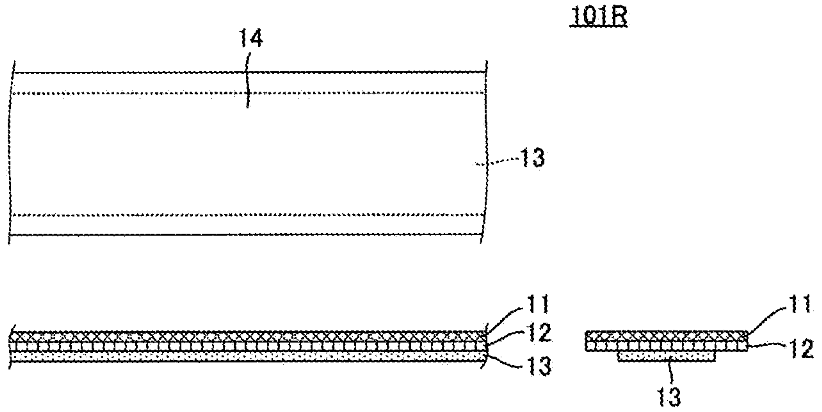
FIG. 2B is a three-view drawing of another high-frequency dielectric attachment according to the first exemplary embodiment.
Figure 2C:
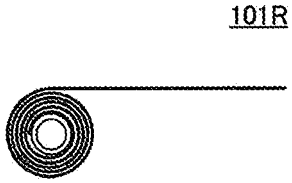
FIG. 2C is an overall side view of the high-frequency dielectric attachment wound in a roll shape.

FIG. 2B is a three-view drawing of another high-frequency dielectric attachment 101R according to the first embodiment. FIG. 2C is an overall side view of the high-frequency dielectric attachment 101R wound in a roll shape. The example illustrated in FIG. 2A describes the state where the high-frequency dielectric attachment is cut in accordance with the affixation range of the object, to which it is to be affixed. FIG. 2B partially describes the state where the high-frequency dielectric attachment is elongated and wound in a roll shape in its longitudinal direction.

The high-frequency dielectric attachment 101R is a laminate of the insulating sheet layer 11, adhesive layer 12, and dielectric sheet layer 13. The insulating sheet layer 11 forms the outermost layer (i.e., the top layer in the orientation illustrated in FIG. 2B), and the adhesive layer 12 and dielectric sheet layer 13 are arranged in sequence below the insulating sheet layer 11. The width W13 of the dielectric sheet layer 13 is smaller than each of the width W11 of the insulating sheet layer 11 and the width W12 of the adhesive layer 12, and the adhesive layer 12 projects beyond the dielectric sheet layer 13 in the width direction.

In this example, the outer surface of the insulating sheet layer 11 has release properties. Thus the separation paper 14 illustrated in FIG. 2A does not exist, and the high-frequency dielectric attachment 101R of a three-layer structure of the insulating sheet layer 11, adhesive layer 12, and dielectric sheet layer 13 is wound in a roll shape. To use the high-frequency dielectric attachment 101R, as in the case of typical adhesive tape, a predetermined length is drawn out of the roll and is cut with a cutter, and the cut portion is affixed to the object.

The high-frequency dielectric attachment of a four-layer structure including the separation paper may also be wound in a roll shape.

Figure 3A:
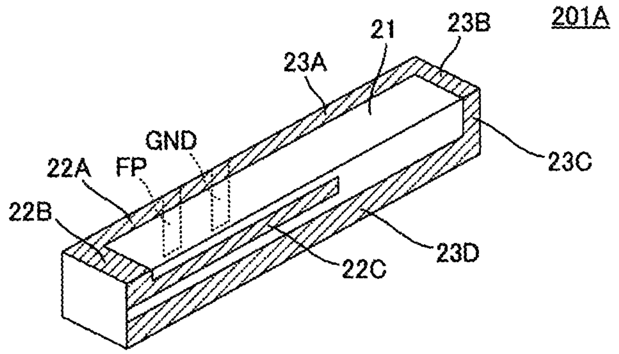
FIG. 3A is a perspective view of an antenna being an object for the high-frequency dielectric attachment according to the first exemplary embodiment.
Figure 3B:
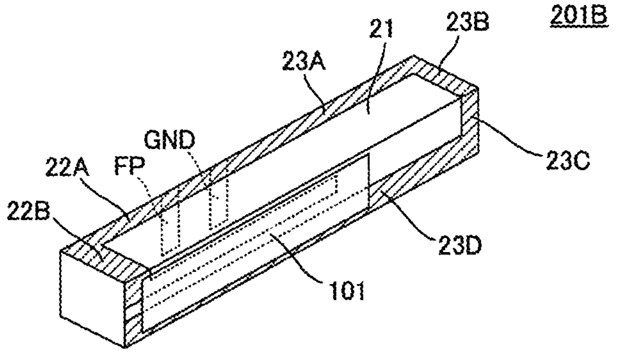
FIG. 3B is a perspective view of an antenna in which the high-frequency dielectric attachment is affixed to the antenna.

FIG. 3A is a perspective view of an antenna 201A being an object for the high-frequency dielectric attachment 101 according to the first exemplary embodiment. FIG. 3B is a perspective view of an antenna 201B to which the high-frequency dielectric attachment 101 is affixed to the antenna 201A.

In the antenna 201A as an object for frequency adjustment, a first radiating electrode (22A, 22B, 22C) and a second radiating electrode (23A, 23B, 23C, 23D) are disposed on the outer surface of a dielectric base 21 having the shape of a rectangular parallelepiped. A feeding electrode FP and a ground electrode GND extend in a predetermined position of these radiating electrodes. The first radiating electrode 22C and the second radiating electrode 23D are parallel and opposed to each other in part and form a capacitance at the open end. This structure forms a so-called branch inverted-F antenna.

As illustrated in FIG. 3B, when the high-frequency dielectric attachment 101 is affixed to the portion where the first radiating electrode 22C and the second radiating electrode 23D are opposed to each other, the capacitance of the radiating electrodes of the antenna is increased. Thus the resonant frequency is decreased.

In the state illustrated in FIG. 3B, the dielectric sheet layer of the high-frequency dielectric attachment 101 is arranged in a region having a high field strength, and the exposed portion of the adhesive layer adheres to a region having a relatively low field strength.

Figure 4:
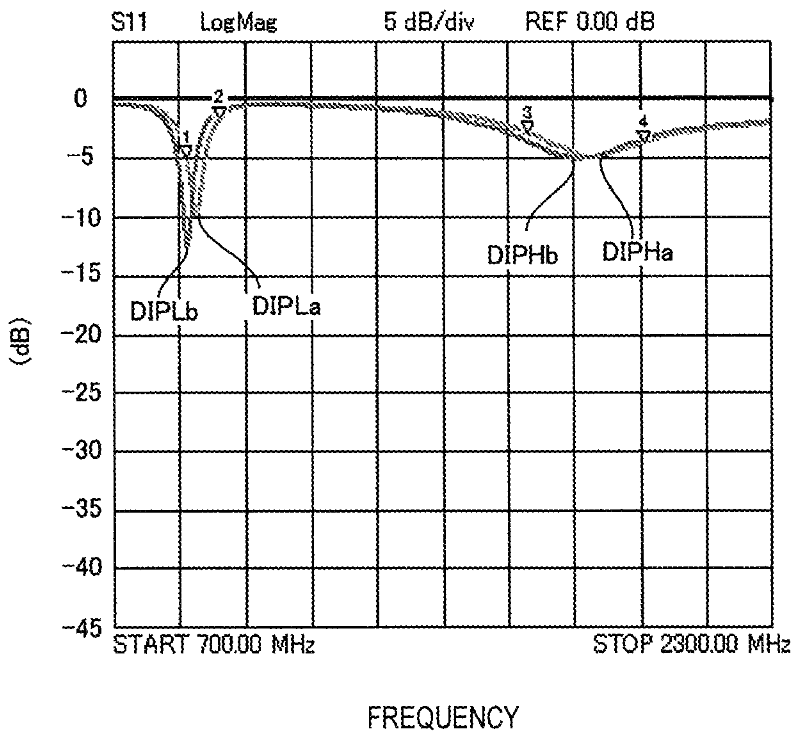
FIG. 4 illustrates the frequency characteristics of return loss of the antenna illustrated in FIG. 3A and the antenna illustrated in FIG. 3B.

FIG. 4 illustrates the frequency characteristics of return loss of the antenna 201A illustrated in FIG. 3A and the antenna 201B illustrated in FIG. 3B. Here, the thickness of the dielectric sheet layer 13 in the high-frequency dielectric attachment 101 is 20 μm, and the relative permittivity thereof is 11. As illustrated in FIGS. 3A and 3B, because of the inclusion of the first and second radiating electrodes, the return loss occurs in two frequency bands: low and high frequency ranges. Before affixation of the high-frequency dielectric attachment 101, the dip DIPLa of the return loss is present in the low frequency range and the dip DIPHa of the return loss is present in the high frequency range. When the high-frequency dielectric attachment 101 is affixed, the center frequency of the dip DIPLb of the return loss in the low frequency range and that of the dip DIPHb of the return loss in the high frequency range are shifted in the direction in which they decrease. In this example, the center frequency of the return loss in the low frequency range is shifted by 20 MHz, and the center frequency of the return loss in the high range is shifted by 40 MHz.

Figure 5:
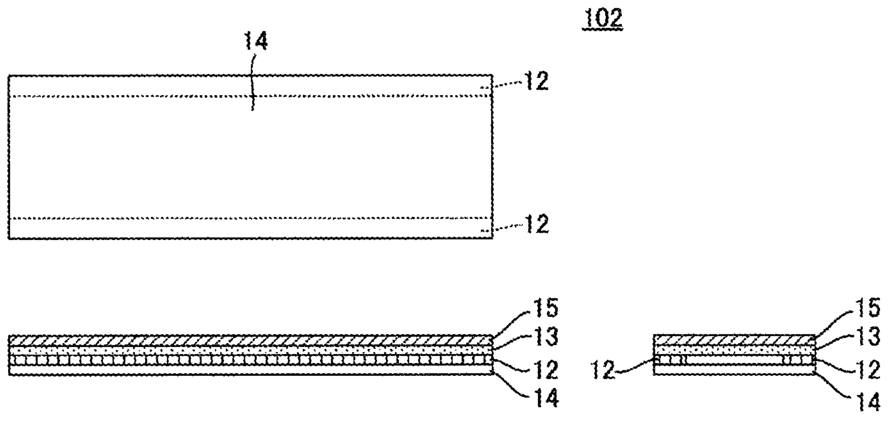
FIG. 5 is a three-view drawing of a high-frequency dielectric attachment according to a second exemplary embodiment.

FIG. 5 is a three-view drawing of a high-frequency dielectric attachment 102 according to a second exemplary embodiment. For the sake of clarity of the multilayer structure, the thickness direction is illustrated in a somewhat enlarged scale. The high-frequency dielectric attachment 102 is a laminate of a conductive sheet layer 15, dielectric sheet layer 13, adhesive layer 12, and separation paper 14. The conductive sheet layer 15 forms the outermost layer (the top layer in the orientation illustrated in FIG. 5. The dielectric sheet layer 13, adhesive layer 12, and separation paper 14 are arranged in sequence below the conductive sheet layer 15. The adhesive layer 12 is arranged in a peripheral portion other than the central portion of the dielectric sheet layer 13.

To use the high-frequency dielectric attachment 102, the separation paper 14 is separated, and the surface from which the separation paper 14 has been separated is affixed to an object. In the state where the separation paper is separated, the adhesive layer 12 is exposed.

Figure 6A:
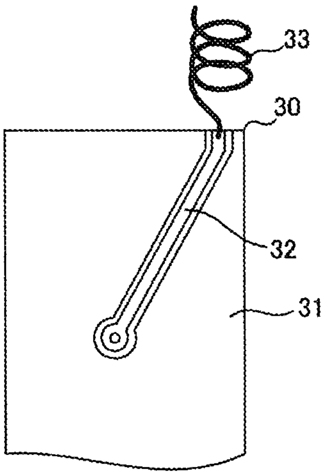
FIG. 6A is a plan view of an antenna feed circuit portion being an object for the high-frequency dielectric attachment according to the second exemplary embodiment.
Figure 6B:
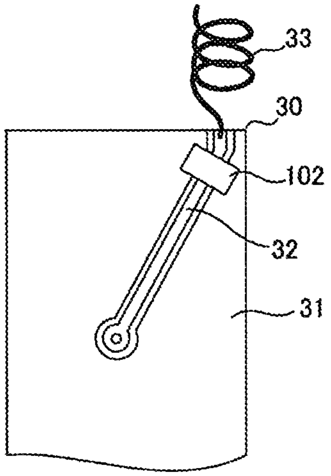
FIG. 6B is a plan view that illustrates the state where the high-frequency dielectric attachment is affixed to the antenna feed circuit portion.

FIG. 6A is a plan view of an antenna feed circuit portion being an object for the high-frequency dielectric attachment 102 according to the second exemplary embodiment. FIG. 6B is a plan view that illustrates the state where the high-frequency dielectric attachment 102 is affixed to the antenna feed circuit portion.

As illustrated in FIGS. 6A and 6B, a coplanar line including a ground electrode 31 and a central electrode 32 is disposed on a substrate 30. The coplanar line is a feeder circuit for a helical antenna 33. For such a feeder circuit, impedance matching of the antenna is important. Here, the substrate 30 is a glass epoxy substrate having a thickness of 1 mm, the central electrode 32 has a line length of 37 mm and a line width of 1.5 mm, and the helical antenna 33 has a diameter of 10 mm and a length of 20 mm and is the one in which copper wire having a diameter of 1 mm is shaped in a helical form.

To adjust impedance matching using the high-frequency dielectric attachment 102 illustrated in FIG. 5, the high-frequency dielectric attachment 102 is affixed to the connection portion between the coplanar line and the helical antenna 33. With that, a capacitance is provided between the central electrode 32 and the ground electrode 31, and the impedance of the coplanar line can be adjusted in the direction in which it decreases.

Figure 7A:
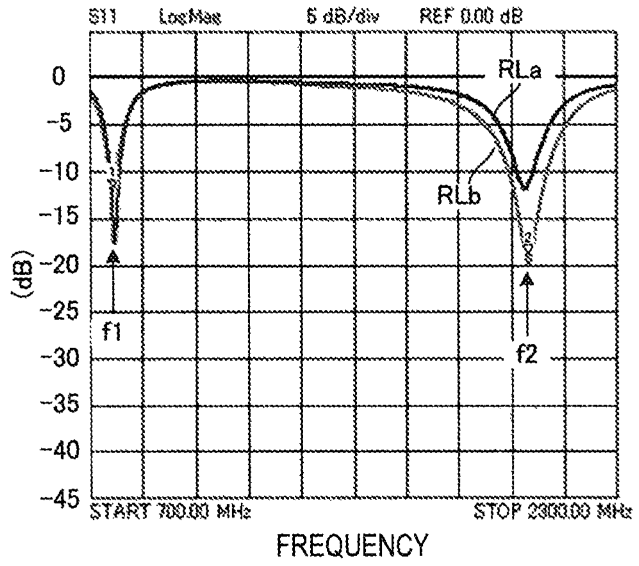
FIG. 7A illustrates the frequency characteristics of return loss of the antenna feed portion illustrated in FIGS. 6A and 6B.
Figure 7B:
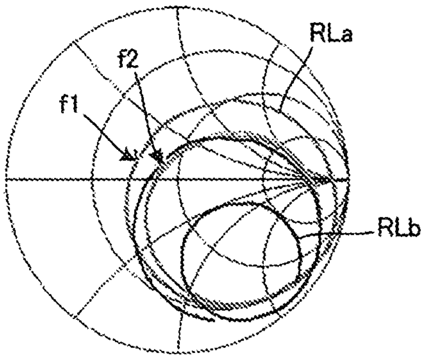
FIG. 7B illustrates the return-loss characteristics before affixation of the high-frequency dielectric attachment on a Smith chart.
Figure 7C:
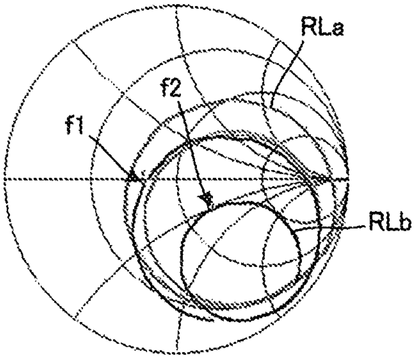
FIG. 7C illustrates the return-loss characteristics in the state where the high-frequency dielectric attachment is affixed, on a Smith chart.

FIG. 7A illustrates the frequency characteristics of return loss of the antenna feed portion illustrated in FIGS. 6A and 6B. FIG. 7B illustrates the return-loss characteristics on a Smith chart before affixation of the high-frequency dielectric attachment 102, and FIG. 7C illustrates the return-loss characteristics on a Smith chart in the state where the high-frequency dielectric attachment 102 is affixed. All of the drawings illustrate the frequency range between 700 MHz and 2300 MHz.

In these drawings, the return loss RLa indicates the characteristics before affixation of the high-frequency dielectric attachment 102, and the return loss RLb indicates the characteristics in the state where the high-frequency dielectric attachment 102 is affixed. The frequency f1 indicates the center frequency of the return loss in the low frequency range, and the frequency f2 indicates the center frequency of the return loss in the high frequency range.

In the case of the one in which the conductive sheet layer 15 is absent (replaced with an insulating sheet layer) in the high-frequency dielectric attachment 102 illustrated in FIG. 5, the effect of the dielectric is low and the return-loss characteristics virtually do not vary.

As described above, when the high-frequency dielectric attachment 102, including the conductive sheet layer, is used, the electrode of an object and the conductive sheet layer are opposed in the thickness direction and a large capacitance occurs. Thus even when the size of the high-frequency dielectric attachment 102 is relatively small, the adjusting effect is high, and impedance can be matched in a local site of the line.

Figure 8A:
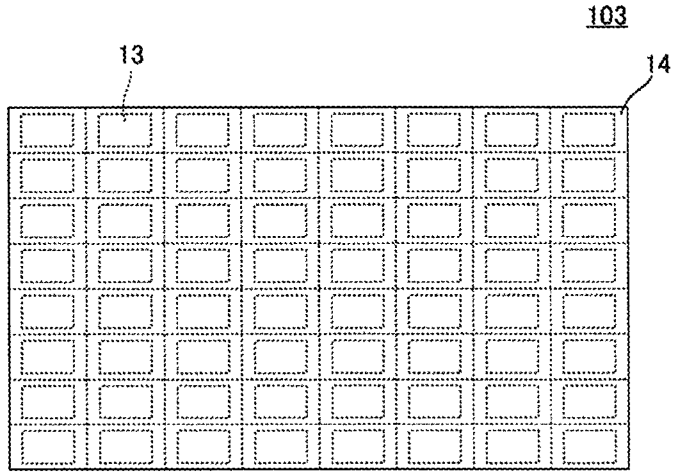
FIG. 8A is a plan view of a high-frequency dielectric attachment according to a third exemplary embodiment, FIG.
Figure 8B:
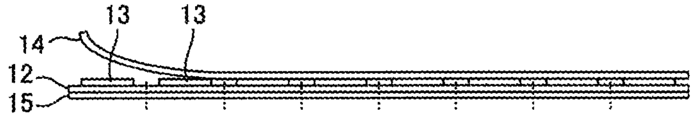
FIG. 8C is an overall side view of a high-frequency dielectric attachment wound in a roll shape.
Figure 8C:
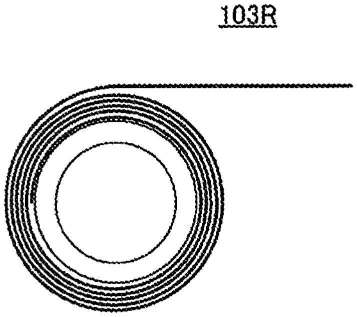

FIG. 8A is a plan view of a high-frequency dielectric attachment 103 according to a third exemplary embodiment. FIG. 8B is a front view of the high-frequency dielectric attachment 103 in the thickness direction. FIG. 8C is an overall side view of a high-frequency dielectric attachment 103R wound in a roll shape. The high-frequency dielectric attachment 103 is a laminate of the conductive sheet layer 15, adhesive layer 12, dielectric sheet layers 13, and separation paper 14. The conductive sheet layer 15 forms the outermost layer (the bottom layer in the orientation illustrated in FIG. 8). The adhesive layer 12, dielectric sheet layers 13, and separation paper 14 are arranged in sequence with respect to the conductive sheet layer 15.

The conductive sheet layer 15 and adhesive layer 12 are continuous. The dielectric sheet layers 13 individually adhere to and are held on the adhesive layer 12. Grooves cut in a half cut manner are formed at the division lines indicated by the broken lines in the drawings in the conductive sheet layer 15 and the adhesive layer 12. Thus the laminate of the conductive sheet layer 15, adhesive layer 12, and dielectric sheet layer 13 is divided at the division lines indicated by the broken lines in the drawings.

The dimensions of the vertical and horizontal sections of each of the dielectric sheet layers 13 are smaller than the dimensions of the sections partitioned by each of the division lines. Thus the adhesive layer 12 projects beyond the dielectric sheet layer 13 in the width direction.

The high-frequency dielectric attachment 103 can be used in such a way that the separation paper 14 is partially separated, the laminate of the conductive sheet layer 15, adhesive layer 12, and dielectric sheet layer 13 is cut into sections at the division lines, and they are individually used. In this way, the laminate can be used after being divided into sections each having a fixed size.

As illustrated in FIG. 8C, to use the high-frequency dielectric attachment 103R, which is wound in a roll shape, the separation paper 14 is partially separated while the high-frequency dielectric attachment 103R is drawn out of the roll, and the laminate of the conductive sheet layer 15, adhesive layer 12, and dielectric sheet layer 13 is cut into sections at the division lines and they are individually used.

The third exemplary embodiment describes the example in which the laminate extends two-dimensionally and the division lines are formed vertically and horizontally. To use the high-frequency dielectric attachment in a roll shape, as illustrated in FIG. 2C in the first embodiment, a division line cut in a half cut manner may be formed in the laminate for each fixed length.

In embodiments according to the present disclosure, the dielectric sheet layer is in direct contact with the main part of an object or the adhesive layer is not in direct contact with the main part of an object. Therefore, a great adjusting effect is obtainable without being under the influence of the Q value and relative permittivity of the adhesive layer. Accordingly, problems resulting from a low Q value and a low relative permittivity of the adhesive layer are avoided.

What is claimed is:

1. A high-frequency dielectric attachment for attachment to a high-frequency circuit, comprising a laminate of an insulating sheet layer, an adhesive layer, and a dielectric sheet layer to adjust electric characteristics of the high-frequency circuit, wherein the insulating sheet layer forms an outermost layer, the adhesive layer and the dielectric sheet layer are arranged in sequence below the insulating sheet layer, the dielectric sheet layer has a width smaller than a width of each of the insulating sheet layer and the adhesive layer, and the adhesive layer projects beyond the dielectric sheet layer in a width direction thereof.

2. The high-frequency dielectric attachment according to claim 1, wherein the laminate has the same width as the width of the adhesive layer and is longitudinally wound in a roll shape.

3. The high-frequency dielectric attachment according to claim 2, wherein the laminate includes separation paper that covers at least an exposed portion of the adhesive layer.

4. The high-frequency dielectric attachment according to claim 2, wherein the laminate has grooves cut in a half cut manner in a thickness direction of the laminate into sections each having a fixed length or a fixed size.

5. The high-frequency dielectric attachment according to claim 1, wherein the laminate includes separation paper that covers at least an exposed portion of the adhesive layer.

6. The high-frequency dielectric attachment according to claim 5, wherein the laminate has grooves cut in a half cut manner in a thickness direction of the laminate into sections each having a fixed length or a fixed size.

7. The high-frequency dielectric attachment according to claim 1, wherein the laminate has grooves cut in a half cut manner in a thickness direction of the laminate into sections each having a fixed length or a fixed size.

* * * * *